(12) United States Patent
Ericson et al.

(10) Patent No.: US 10,553,032 B2
(45) Date of Patent: Feb. 4, 2020

(54) AUGMENTED REALITY OUTPUT BASED ON ITEM ACQUISITION LIMITATIONS

(71) Applicant: PAYPAL, INC., San Jose, CA (US)

(72) Inventors: Braden Christopher Ericson, San Jose, CA (US); Zachary Joseph Berman, San Jose, CA (US); Gautam Madaan, San Jose, CA (US); Anush Vishwanath, Santa Clara, CA (US); Pushpita Karmakar, San Jose, CA (US); Anke Werner, San Jose, CA (US); Michael Charles Todasco, Santa Clara, CA (US); Vidit Maniyar, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 42 days.

(21) Appl. No.: 15/857,295

(22) Filed: Dec. 28, 2017

(65) Prior Publication Data

US 2019/0206130 A1 Jul. 4, 2019

(51) Int. Cl.
*G06T 19/00* (2011.01)
*G06K 9/00* (2006.01)
*G06Q 30/06* (2012.01)

(52) U.S. Cl.
CPC ........ *G06T 19/006* (2013.01); *G06K 9/00671* (2013.01); *G06Q 30/0643* (2013.01)

(58) Field of Classification Search
CPC ............ G06Q 30/0643; G06K 9/00671; G06T 19/006
See application file for complete search history.

(56) References Cited

U.S. PATENT DOCUMENTS

| | | | |
|---|---|---|---|
| 2014/0052555 A1* | 2/2014 | MacIntosh | G06Q 20/208 705/23 |
| 2015/0294385 A1* | 10/2015 | Grigg | G06Q 30/0613 705/26.41 |
| 2018/0182025 A1* | 6/2018 | Smith | G06Q 30/0643 |

* cited by examiner

*Primary Examiner* — Michael Le
(74) *Attorney, Agent, or Firm* — Haynes and Boone LLP

(57) ABSTRACT

There are provided systems and methods for an augmented reality output based on item acquisition limitations. A user may capture visual data utilizing a device at a location, where the visual data includes one or more items available for acquisition at the location. A device may perform object recognition to identify the items within the images, and determine an item identifier. Using the item identifier, item data may be retrieved, and may be compared to restrictions on item acquisitions set for an account of the user. A visual output of a representation of the item in the visual data may then be configured to enhance or diminish the item's representation. The change in the item's representation may be output as an augmented reality visible to the user as the user views captured data of a scene including the item.

20 Claims, 5 Drawing Sheets

AUGMENTED REALITY OUTPUT BASED ON ITEM ACQUISITION LIMITATIONS

TECHNICAL FIELD

The present application generally relates to augmented reality, and more specifically to customized interface elements and graphical displays in captured visual data using augmented reality.

BACKGROUND

Various types of service providers may provide recommendation and transaction processing services that may further provide processes to create and set limitations on item purchases, such as a budget. The budget may limit types or amount of purchases and are often set by users to meet financial goals. The budgets provide basic information that may assist users in meeting financial goals, but often do not reflect items that assist a user in meeting that budget, or items that may break a budget. For example, a budget may not reflect price differences in types or brands of eggs or other food items purchased, where the food item may be a necessary purchase during a grocery shopping experience. These budgets further provide basic information on expenditures, and do not update or track potential purchases, such as those that occur when items are added to an online or real-world shopping cart. Thus, the information provided to users may not be provided to users in an useful or efficient manner for data processing.

Figure 1:
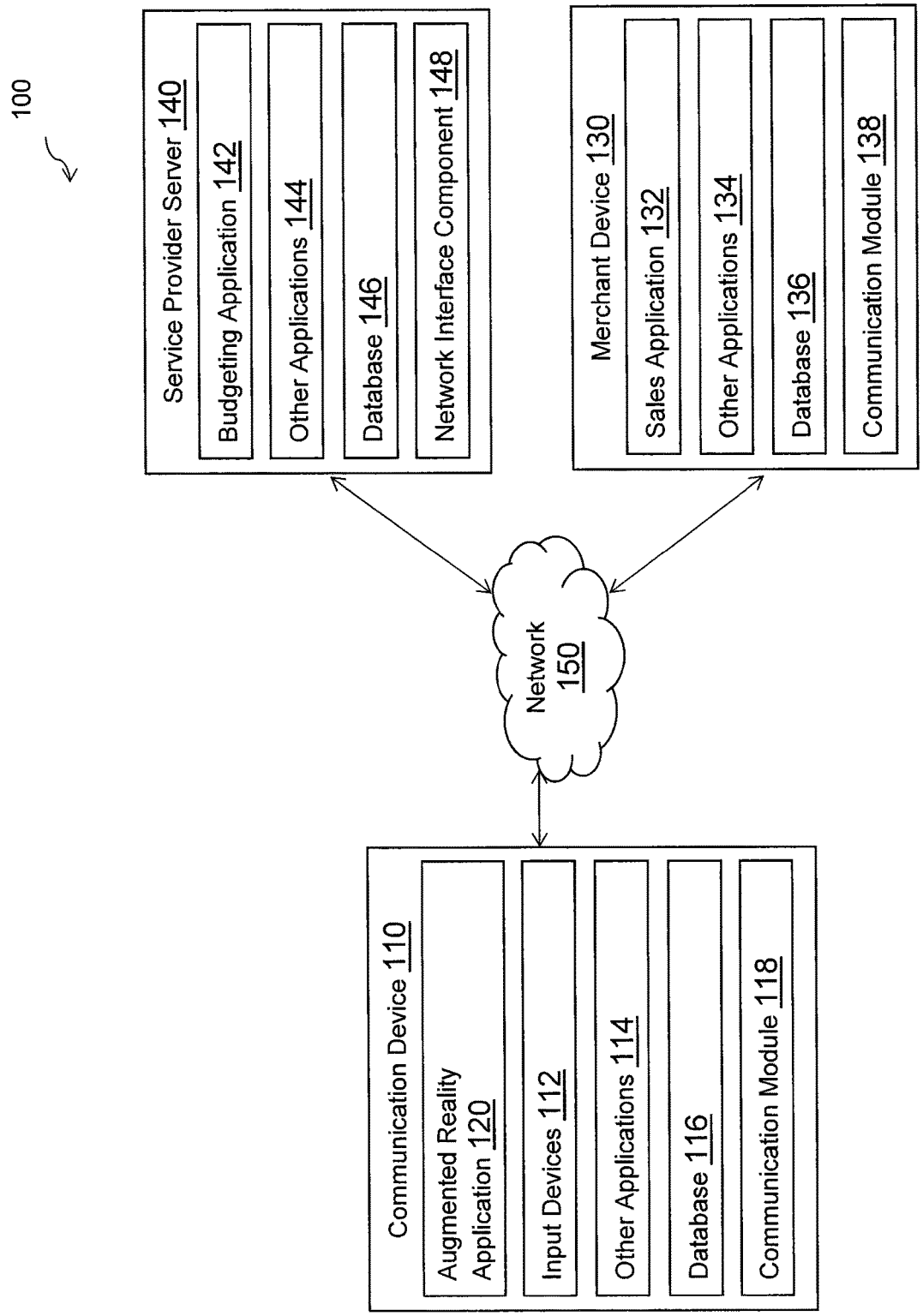
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for an augmented reality output based on item acquisition limitations. Systems suitable for practicing methods of the present disclosure are also provided.

According to various embodiments, a user may utilize a communication device while performing browsing or shopping actions, including real-world shopping at physical merchant locations and online shopping through one or more virtual online marketplaces. The user may view an item, such as a real-world object for sale or online offer for sale of an item, which may have an appearance altered based on restrictions the user has set on item acquisition, such as a budget that monitors spending through an online account of the user with a service provider. The user may establish the budget with the service provider prior to the shopping session. The communication device of the user may receive the budget data, and may identify items in the visual data using one or more image processing techniques. Based on the item identifications, the communication device may determine which items meet a user's budget, or include constraints on purchase, such as exceeding an acceptable level to spend on the item. The communication device may then generate visual adjustments and changes for the items in the visual data to make the visual data adhere to the budget. For example, items within a budget may be highlighted, include a graphical overlay to reinforce purchase of a particular item, may be unblurred, or may otherwise be made visible to draw a user's attention to the item. Conversely, items outside of a budget or that may be detrimental to a budget if purchase may be blurry, include an overlay to deter purchase of a particular item, or may otherwise be made less visible or invisible in the visual data. In other embodiments, the visual data may be communicated to the service provider, which may generate the augmented reality or other output data using visual adjustments and changes for items based on the budget. As the user selects items for purchase, which may be done prior to completing a purchase transaction, the budget may be updated and item visual appearances in the augmented reality may be adjusted based on the change in the budget. In this way, a device may configure and output an augmented reality that includes real-time image adjustments to convey previously static data to a user in a clear and easily viewable interface output.

In order to establish a budget, a user may create an account with a service provider. The user may be required to provide personal or other identification information to establish the account, such as a name, address, and/or other information. The user may also be required to provide financial information, including payment cards (e.g., credit/debit cards), bank account information, gift cards, and/or benefits/incentives, which may be utilized to provide payments or otherwise engage in processing of another transaction. In order to create an account, the user may be required to select an account name and/or provide authentication credentials, such as a password, personal identification number (PIN), security questions, and/or other authentication information. The service provider may utilize such information to create the account for the user, and provide the user with a digital wallet to the user that allows for electronic transaction processing. The digital wallet may store the user's financial instruments of the user and allow the user to process transactions through the digital wallet. In this regard, the service provider may provide a digital token, such as a data package, that represents the digital wallet and may approve the digital wallet for processing of a transaction with the service provider to a device that receives the token. Thus, the token may include data identifying the digital wallet (e.g., a token), as well as authentication information including an identifier for user of the digital wallet, which may be encrypted.

Once an account is created, the account may be accessed through a web browser from a website of the service provider and/or a dedicated application of the service provider, such as a mobile smart phone application. The application (or website) may be associated with a payment provider, such as PayPal® or other online payment provider service, which may provide payments and the budgeting services. The application may execute on the computing device for a user, and may provide various functionalities and processes to the user, including engage in transaction processing through accessing their respective account and providing transaction information for the transaction, as well as establishing a budget for a user. For example, a user may utilize the account to enter budget information. The budget information may correspond to one or more constraints or restrictions on purchase of items and/or expenditures. For example, a budget may set a goal to only spend a certain amount, which may be location based, time based (e.g., per day/week), and/or based on the type of transaction (e.g., grocery shopping, which may occur through multiple locations). The budget may also be particular to certain items, such as those items required to be purchased in a shopping list (e.g., general food item requirements in a grocery list over ancillary purchases such as candy) or a necessity based item requirement (e.g., gas, a housing repair item, etc.). The item requirements may be general, such as eggs, or may be particular to brand, type, cost, etc. For example, a user may set a budget to purchase general tissue paper instead of a particular brand, or may set a maximum cost amount. In other embodiments, the service provider may determine the budget using previous expenditures of the user and transaction histories, for example, by determining what normal purchases are made by a user, including item, brand, type, or other item data. The service provider may also determine items for a budget based on available funds of the user, as well as future expenditures, income, or other available data.

Budgetary data may be communicated to the service provider, and may be stored to the communication device for use in determining augmented reality content based on item purchase restrictions. In other embodiments, the service provider may determine the augmented reality. In this regard, the user may utilize a communication device to capture visual content or other data including a representation of one or more items. For example, image, video, or other audiovisual data at a physical merchant location may capture a representation of an item as an object within an environment at the physical merchant location. The user's communication device may include a camera, microphone, or other input device that may be used to capture visual data of a scene that includes the item, such as an image or video of the item as well as other nearby objects in the real-world environment. In order to identify items within the environment, various visual data captured by the camera of the device may be used. Within an image or video, the representations, locations, and other visual data of items, items, or users may be used to identify items. Additionally, the data captured at a physical merchant location may include audio or video data that further may be used to determine and identify the item within the environment.

For example, the video or other image data may be required to be processed to determine and/or recognize the item within the data. In this regard, visual data (e.g., images and/or videos) capturing one or more items may be processed to recognize the item within the image. One or more image processing techniques and recognition algorithms may be utilized to determine an item within visual data, including item/image recognition. An image processing and/or item recognition process may be used to identify the item through comparison of the captured data to other images/video and/or analysis of the data using known item features, landmarks, or other signifying data points. For example, item feature data may be extracted, which may include distances between signifying points or points of interest in the visual data. Depth or width of these signifying points or image landmarks may be extracted, as well as a size relative to other features in the visual data. Other data points may also be determined in the visual data, which may include other features of note.

One or more databases may also be accessed that allows recognition, detection, and identification of the item in the visual data, for example, by comparing the visual data to stored parameters, data, and/or information for the item or other item that identifies the item. The environment and/or an item of interest to a user may be designated with physical cues, such as pointing to an item, user, or location within the environment. Other data may be used to identify the environment and/or items, for example, audio data, including verbal statements, may identify the item and/or the environment or other data necessary to identify the item.

Machine learning algorithms may also be used to contextually determine or recognize an item in the visual data, for example, based on past tags of items and their associated visual data and/or identification of the item in other visual data. In various embodiments, an image pre-processor service and/or device associated with the location having the item in the captured visual data may previously capture video or audiovisual data including the item. The previously captured data may be processed by the pre-processor service or device to identify the item, which may include identification of features, landmarks, and other visual data that may be used by other devices to identify the item. For example, wording on the device, a logo or tag, a barcode or QR code, a location relative to other objects, or other data may be determined by the pre-processor, and may be retrievable by the communication device at the location and used to determine an identification of the item. The pre-processed item identification may be provided and maintained by the merchant or the service provider associated with the location. Thus, the communication device may include stored visual data of one or more items and/or contextual information for the visual data (e.g., where the visual data was captured, when the visual data was captured, color of the item, environmental information in the visual data, contrast and/or lighting in the visual data, and other context related data for the visual data). Thus, computer algorithms, image processing techniques, and/or machine learning processes may be utilized to determine and identify an item in visual data captured by the first user. The communication device capturing visual data at a location may receive identification data, including the pre-processed item visual identifiers, from one or more devices at the location, or the information may be pushed to the communication device based on a determining a location of the user through a GPS module or locator associated with the user, such as a GPS locator of the user's communication device. In various embodiments, the communication device may also receive item identifiers from one or more tags, such as an RFID tag or BLE beacon, at or nearby the item, which may be used to identify the item.

In other embodiments, the data that includes the object or other item for sale may correspond to other types of shopping or item browsing information, such as online shopping data or a user's online browsing information that displays information for the item. For example, the user may browse items for sale in an online marketplace or may view an item for sale through an advertisement in a message, email, on a website, or otherwise presented to the first user. A toolbar, application, or other process may capture item data during the browsing session on the communication device, and may identify the items through the browsing data, item information, and/or application/website metadata. In various embodiments, the toolbar, application, or other process may transmit the information to the service provider for item identification and and/or altering of interface output data based on a budget. Other metadata may also be associated with the item shopping or browsing data, including the visual data or the online browsing data, may include a time of capture or browsing, how the data was created (e.g., from what web site or platform, which type of device or the device capturing the data), why the data was captured (e.g., in response to an advertisement, viewing items in a store, etc.), or other type of metadata informing the service provider about the item shopping or browsing data. Additional information in the visual data or online shopping/browsing data, or metadata for the captured data, may be used to determine and/or identify the item, a type of the item, amount or number of the item, or other specific details of the item (e.g., a brand, a sub-group of the item, a color/flavor/other type of the item, etc.). Information in the visual data that may be used to determine a corresponding item may include text within the image, color, contrast, lighting, geographic location, time of capture of the visual data, audio within the visual data, or other data within the visual data or associated with the visual data, such as metadata. In this regard, different items may be sold in different flavors, types, brands, or other versions in specific locations, which may be detected based on color, description on packaging, geographic location, or other information.

Once the item in the captured data is determined, the communication device (or service provider) may generate an item/object-specific visual indicator, change, or modification of a representation of the item in the captured data and may be determined based on the user's budget or other constraint or restriction on purchase or acquisition of the item by the user. The indicator may correspond to a visual change of the display or output of the item to recommend the item for purchase or to cause the item to not be recommended for purchase and instead be ignored by the user. The visual indicator or modification of the item may correspond to a graphic object overlaid onto the item in the representation of the item in the data, or may adjust output parameters for the item, such as pixels, resolution, size, brightness settings, color gradient, etc. For example, the indicator or modification may be done by one or more of highlighting the item, adjusting a color gradient of the item, blurring or unblurring the item, or adjusting a brightness of the item. The indicator may also correspond to text overlaid onto the item or placed near the item.

In this regard, in order to recommend an item for purchase if the item meets the user's budget, the visual indicator or modification may make the item more visible to the user. For example, an indicator or modification may be used to draw the user's attention to an item by making the item appear more visible or attractive to the user in the data displaying the item. Conversely, in order to de-emphasize an item, the visual indicator or modification may hide the item, make the item less visible, or may make the item appear less attractive to purchase. Making the item more or less attractive can be specific to the user or for general users. For example, the item may be made less attractive by minimizing a size of the item, making the item darker or more blurry, reducing a color gradient of the item so that the item is less colorful or in black and white/grayscale, or otherwise making the item less noticeable. The item may be highlighted based on the same or similar previous purchase, such as purchases for a specific brand of eggs or at a certain price point for eggs (e.g., for eggs $3.99 or less). In other embodiments, the item indicator or modification may be based on the current item data for the item matching the budget information for the user. Thus, the item data for the item may be compared to the budget for the user, and the item recommendation using the indicator or modification may be determined based on determining whether a price (or item type, brand, etc.) for the item matches or meets a requirement for the budget, or whether the price (or other item data) for the item exceeds or does not meet a constraint or restriction on purchases by the user. The item data may previously be retrieved using the item identification, and may be retrieved from the service provider, a device/server associated with the location for the visual data or providing the online browsing data.

Where the item data matches the budget so that a purchase of the item would not violate a budget of the user, the indicator or the modification may therefore be determined to provide a visual output that increases the significance of the items visual representation in the output data displaying the representation of the item. In other embodiments, the communication device may determine that the item should not be recommended, and may configure the indicator to decrease the significance of the item's visual representation, or entirely hide the visual representation. Once the indicator or other visual modification of the item for the capture data is determined, the visual indicator may be output with the captured visual data as an augmented reality visual output within a graphical user interface of the user's communication device. Where the captured data corresponds to online shopping data, the visual indicator may be output with the online shopping data, for example, as a blended display of the visual indicator with website or application interface display data.

Thus, the images, video, or audiovisual content including the item may be output to the user on a display component of the user's communication device. For example, a mobile application associated with a camera of a mobile smart phone may display a viewfinder interface having the image or video that includes the real-world or online objects including the item, or may display the captured image or video through another graphical user interface of the application. The displayed data may be augmented based on the visual indicator or modification to display such data back to the user on or with the item in the output data. For example, a visual indicator may be displayed as a graphic overlaid onto the representation of the item in the displayed environment, such as a highlight of the item, a box around the item, a pointer to the item, or other information. A modification may also be displayed by modifying display values for the representation of the item in the output data. The visual indicator or modification may also be selectable and may be interacted with through one or more input device of the communication device, for example, to pull up item information for the item.

Thus, an augmented reality having the environment with one or more computer generated graphics or other data may be output to the first user. The user may interact with the augmented reality to change the visual indicators or modifications for items, or highlight specific items for inputting a budgetary recommendation or adjusting a budgetary recommendation associated with the item. In various embodiments, a device of the user may correspond to a wearable computing device, which may present the indicators or recommendations onto currently viewed environments by the user as the augmented reality. For example, wearable eyeglasses with associated computing devices may present the augmented reality when the user is viewing or in an environment corresponding to the item. In other embodiments, the output data may be displayed when the user is browsing online items for sale, such as through a marketplace on a website or accessible through a dedicated application executing on a device, which may be overlaid in the website or application interface presented through the device interface.

Moreover, as the user performs actions in the environment or during the online shopping session, the visual indicators or modifications of visual output of the item may be altered. For example, where the visual item is originally recommended through an indicator that highlights the item, but the same or similar item has been added to a real-world or digital shopping cart, the visual indicator may be changed to no longer highlight the item and/or instead change to a visual indicator that does not recommend the item or obscures/hides the item. In other embodiments, if the item is originally obscured or hidden as a non-recommended item, the item may be revealed in the output data if other purchases by the user come in under the budget of the user or satisfy the items required to be purchased by the user and there is additional available funds for further purchases. For example, items may be detected as the user picks up the item and places the item in a shopping cart through video analysis of the user's actions or through detection of the user adding the item to a digital shopping cart. A transaction history with an actual purchase of one or more items may also be determined. Such data may be used to alter the visual indicators and/or modifications of one or more item representation outputs. Thus, the visual indicator may be dynamic based on changing real-time data of the user's budget through detection of other item potential and actual purchases.

In this regard, an augmented reality may be generated that provides contextually useful and relevant data to a user that would normally not be visible to a user when viewing real-world or online data. Thus, a communication device may assist in data determination and output of visual data through performing object recognition and image processing that assist in presenting the augmented reality. Additionally, the communication device may provide for item identification and item data look-up automatically through the object recognition processes without requiring the user to search for item data. This allows for automated generation of the augmented reality. Additionally, the augmented reality or other modified data output may further be dynamic to change in real-time based on changing conditions and available data, such as determination of user actions that cause changes to restrictions on item acquisitions as well as changing visual data.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a merchant device 130, and a service provider server 140 in communication over a network 150. A user (not shown) may utilize communication device 110 to utilize the various features available for communication device 110, which may include processes and/or applications associated with service provider server 140 to set a budget on purchases which may establish constraints or restrictions on acquisitions of items (including services) or other objects within a real-world or online environment. The user may utilize communication device 110 to capture shopping or browsing data of an item or other object, including online data and/or real-world data. The data may include a representation of one or more items, where the items may be identified through image processing by communication device 110 and/or service provider server 140, as well as through data provided by one or more image pre-processing devices, including one provided by merchant device 130. After recognition of an item, item data may be retrieved and compared to the established budget to determine whether purchase of the item is within or outside of the budget. Based on the comparison, an augmented reality that enhances or diminishes a visual output of the item's representation may be determined and output using communication device 110.

Communication device 110, merchant device 130, and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with merchant device 130, and/or service provider server 140. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110 of FIG. 1 contains an augmented reality application 120, input devices 112, other applications 114, a database 116, and a communication module 118. Augmented reality application 120 and other applications 114 may correspond to executable processes, procedures, and/or applications with associated hardware. In other embodiments, communication device 110 may include additional or different modules having specialized hardware and/or software as required. Augmented reality application 120 may correspond to one or more processes to execute software modules and associated devices of communication device 110 to receive or record visual data and process the visual data to determine an identification of an object in an environment and associated item data, as well as generate or alter a visual indicator or other visual modification of the object in the environment through an augmented reality output. In this regard, augmented reality application 120 may correspond to specialized hardware and/or software utilized by a user of communication device 110 that first receives, captures, and/or records video data, including audiovisual data that includes audio data that may also be processed to determine item identifications in the environment. Augmented reality application 120 may utilize a camera or other optical/visual data capturing device of input devices 112. The captured video data may include environment data, which may include a visual representation of an item that is used to identify the item. Item identification and/or item data may be determined through received identification data for one or more items in an environment in image or video data that provides contextual data allowing for identification of the object. For example, merchant device 130 and/or service provider server 140 may pre-process capture image or video data at a location to identify features of recognition for items in the visual data. In various embodiments, other communication devices may previously capture image or video of the item in the environment, and perform image processing and item identification, where the item identification data is available to other devices, including communication device 110, as crowd-sourced data and data processing from the other devices. Identification data for those features may be stored with item data particular to each item, such as a price, item information, comparable items, item brand/type, etc. This identification may be done through image processing and/or user input for an administrator or owner of the environment. In other embodiments, augmented reality application 120 may instead utilize object recognition or other image processing to identify one or more features, terms, or other data in the visual data, which may be used to submit a query and locate item data for the item.

Augmented reality application 120 may receive or record audio data, for example, using a microphone of input devices 112. The audio data may include statements, conversation, and other spoken content by the user that may be used to identify an item and/or interest in an item, for use in identifying the item and determining an augmented reality for the item. In this regard, the audio data may include identification data, such as a name of an object, identification of the object and/or contextual data allowing recognition of the object (e.g., a location of the object in video data, a color of the object, a shape or type of the object, a description of the object, etc.). The object may correspond to an item for purchase. The audio data may be processed with video data to identify the item within an environment and alter the item's visual output in an augmented reality through an output display interface and device of communication device 110. In various embodiments, one or more of the processes to identify an item or other object in an environment through image processing, as well as generate the visual indicator for the item based on a budget or other constraint of purchase or acquisition, may be performed by service provider server 140.

Once item data is determined, augmented reality application 120 may access, retrieve, or otherwise determine budget data, which may correspond to constraints or restrictions on purchases. The budget data may limit purchases to an amount or by item, item type, item brand, or other item detail. The budget data may previously be set with the user of communication device 110 with service provider server 140, or may be determined by service provider server using received input, preferences, transaction histories, and/or account/financial information of available funds, upcoming expenses, and upcoming income, as discussed herein. Using the budget data, augmented reality application 120 may determine whether to enhance or diminish the visual representation in the item in order to make the item appear more or less appealing for purchase, or allow the user to view or not view the item based on the user's budget data. In this regard, augmented reality application 120 may determine a visual recommendation for the item's visual appearance in the visual data, which may highlight or deemphasize (or even hide) the item in the visual data. Once the visual recommendation is determined, augmented reality application 120 may determine a visual indicator, change, or modification of the visual appearance of the item in the visual data, which may correspond to a graphical overlay and/or a modification of image/video parameters for the item. The visual indicator may correspond to highlighting, adding text, or placing another graphic on or near the item's visual representation, or may include adjusting pixels, resolution, size, brightness settings, color gradient, or other image/video parameter. For example, the indicator or modification may be done by one or more of highlighting the item, adjusting a color gradient of the item, blurring or unblurring the item, or adjusting a brightness of the item in the image, or may include overlaying other images or graphics onto the item.

Using the generated visual indicator, the captured audio and/or visual data by augmented reality application 120 may be used to determine an augmented reality, where the visual indicator is displayed as graphics by augmented reality application 120 overlaid or modifying the visual output of the displayed environment. The augmented reality may therefore display visual data of the environment with generated visual output data of item visual indicators or modifications based on a budget, which may alter the normal or original view of the item in the visual data. The augmented reality may therefore correspond to a computed manipulation of an actual or original view of the environment captured in visual data by input devices 112, where the augmented reality is determined using augmented reality application 120, as discussed herein. Augmented reality application 120 may instead correspond to processes to perform online shopping and/or browsing for one or more items. In this regard, augmented reality application 120 may initially allow the user to access an online marketplace or otherwise browse items available over a network, such as the Internet. The user may view an advertisement or offer for sale of an item within a marketplace, which may similarly be adjusted as described above to present an augmented view of one or more application or website interfaces, such as a change of a webpage interface output.

Augmented reality application 120 may also provide transaction processing services or may detect transaction processing event, for example, through one or more processes that provide an interface to permit the user to enter input and other data for transaction information, for example, through an input device (e.g., touch screen with a graphical user interface, keypad/keyboard, mouse, etc.) and/or through a data capture device (e.g., scanner, camera, other optical device, etc.). Such information may be used to alter an augmented reality having the previously output visual indicators or modifications of an item's visual representation in visual data, for example, by removing, hiding, or making the item more diminished where the item no longer is compatible with a budget based on purchased or selected for purchase items, or revealing or highlighting the item in the augmented reality when the purchases or selected items for purchase conform to a budget and the budget allows purchase of previous items that would not be compatible with a budget.

Input devices 112 corresponds to at least on optical or visual capture device of communication device 110 enabling a user associated with communication device 110 to capture or record images, including still and/or video images. Input devices 112 may correspond to a digital camera on communication device 110 (e.g., incorporated in communication device 110 such as a mobile phone's digital camera in a traditional camera orientation and/or a forward facing camera orientation that captures one or more users as they use and view a display screen of communication device 110) or associated with communication device 110 (e.g., connected to communication device 110 but incorporated within a body or structure of communication device 110), or may more generally correspond to any device capable of capturing or recording an image, video, or other digital media data. As a digital camera, input devices 112 may include a sensor array disposed on a semiconductor substrate having a plurality of photosensitive elements configured to detect incoming light. In other embodiments, other types of electromagnetic radiation sensors may be used, including infrared sensitive sensors/elements and the like. A camera of input devices 112 may include various features, such as zoom, flash, focus correction, shutter speed controls, or other various features usable to capture one or more images or videos of the user and/or other users or objects. Input devices 112 may include other media capture components, including a microphone to capture audio data. Input devices 112 may further display a preview and/or captured image to the user through another device of communication device 110, such as a viewfinder, screen (e.g., mobile phone touch screen, tablet touch screen, and/or personal computer monitor), or other display. Input devices 112 may interface with one or more applications of communication device 110 to capture visual media data, such as images/videos, and may output an augmented reality of the captured visual media data to provide budgetary recommendations and alterations of item appearances in the visual data based on the budgetary recommendations.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices, including speakers, which may display an augmented reality to a user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with online shopping application 140 and/or other applications 114, identifiers associated with hardware of communication device 110, or other appropriate identifiers, such as identifiers used for payment/user/device authentication or identification, which may be communicated as identifying communication device 110 to service provider server 140. In various embodiments, budget data and other restrictions on item/object acquisition may be stored to database 116 for use by communication device 110. Database 116 may also store captured audio, video, or audiovisual content. An augmented reality and/or graphics overlaid onto a display of captured data may be stored to database 116.

Communication device 110 includes at least one communication module 118 adapted to communicate with merchant device 130 and/or service provider server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices (e.g., merchant device 130) using short range communications, such as Bluetooth Low Energy, LTE Direct, WiFi, radio frequency, infrared, Bluetooth, and near field communications.

Merchant device 130 may be implemented using any appropriate hardware and software configured for wired and/or wireless communication with communication device 110 and/or service provider server 140. Thus, merchant device 130 may include data necessary to provide sales of items, for example, through a physical merchant location or online merchant marketplace. In this regard, merchant device 130 may correspond to a point-of-sale device configured to provide transaction processing, or other type of device, including personal computing devices, mobile smart phones, and/or wearable computing devices. Merchant device 130 may also correspond to a server or other device providing an online marketplace where items may be purchased and/or item information associated with a captured object in an environment may be retrieved. Merchant device 130 may further be used to pre-process visual data of an environment to identify item features, locations, and other identification information necessary for communication device 110 to identify those items in captured visual data. In other embodiments, service provider server 140 or another entity, such as one or more communication devices providing crowd-sourced processing and data, may perform such services. Although only one merchant device is shown, a plurality of merchant devices may function similarly.

Merchant device 130 of FIG. 1 contains a sales application 132, other applications 134, a database 136, and a communication module 138. Sales application 132 and other applications 134 may correspond to processes, procedures, and/or applications executable by a hardware processor, for example, a software program. In other embodiments, merchant device 130 may include additional or different modules having specialized hardware and/or software as required.

Sales application 132 may correspond to one or more processes to execute modules and associated specialized hardware of merchant device 130 that provides an interface and/or online marketplace to sell one or more items offered by a merchant (not shown) associated with merchant device 130, and further provide checkout and payment processes for a transaction to purchase the items for sale from the merchant corresponding to merchant device 130, where such transaction processing services may be provided through service provider server 140. In this regard, sales application 132 may correspond to specialized hardware and/or software of merchant device 130 to provide a convenient interface to permit a merchant to offer items for sale. For example, sales application 132 may be implemented as an application offering items for sale that may be utilized by the merchant or a merchant employee to enter item data for one or more items, including a description, price, inventory, or other item data that may be relevant to item purchases and may be used to determine whether an item is compatible with a budget of a user. In other embodiments, merchant device 130 may be local to a physical merchant location and provide transaction processing processes through interfaces displayed to a merchant or merchant employee at the merchant location. Sales application 132 may include information for a price for the item, a discount for the item, a price change for the item, and/or other incentives for items at the merchant location, as well as discounts, rebates, and other incentives that may affect and item's purchase and a user's budget. The sales data and other item data may be retrievable by communication device 110 and/or service provider server 140, such as requestable through an API call, retrievable from a database, and/or scraped from an online resource. Thus, the item information may be used to determine and/or generate a visual indicator as a recommendation for purchase of an item in data capturing the item. Sales application 132 may also provide identification information necessary to identify an item in visual data, including image or video identification data that may be communicated to communication device 110 to identify items in captured visual data. In this regard, sales application 132 or another device/server may pre-process visual data of an environment to determine items in the environment and establish particular identification data of features and points of the items in visual data. The identification data may also correspond to data used during object or text recognition to identify items, including names, bar/QR codes, colors, texts, graphics or logos, or other data.

Sales application 132 may be used to establish a transaction once the user has selected one or more items for purchase. The transaction information may be used to determine budget changes or items for purchase by a user having a budget, which may affect a current augmented reality displaying item information. Thus, the transaction information entered to sales application 132 may cause the augmented reality on communication device 110 to change and be re-processed and output based on communicating the transaction information to communication device 110. Once a payment amount is determined for the transaction for the item(s) to be purchased, sales application 132 may request payment from the user. Sales application 132 may receive payment processing information. Thus, payment may be provided to the merchant account, and notification of payment (or failure, for example, where there are insufficient user funds) may be sent to sales application 132. The payment may be made by service provider server 140 on behalf of the user. Sales application 132 may then receive the results of the transaction processing, and complete the transaction with the user, for example, by providing the user the items for the transaction or declining the transaction where the user is not authenticated or the transaction is not authorized (e.g., insufficient funds).

Merchant device 130 includes other applications 134 as may be desired in particular embodiments to provide features to merchant device 130. For example, other applications 134 may include security applications for implementing server-side security features, programmatic client applications for interfacing with appropriate application programming interfaces (APIs) over network 150, or other types of applications. Other applications 134 may also include email, texting, voice and IM applications that allow a user to send and receive emails, calls, texts, and other notifications through network 150. In various embodiments, other applications 134 may include financial applications, such as banking, online payments, money transfer, or other applications associated with service provider server 140. Other applications 134 may contain software programs, executable by a processor, including a graphical user interface (GUI) configured to provide an interface to the user.

Merchant device 130 may further include database 136 which may include, for example, identifiers such as operating system registry entries, cookies associated with sales application 132 and/or other applications 134, identifiers associated with hardware of merchant device 130, or other appropriate identifiers, such as identifiers used for payment/user/device authentication or identification. Identifiers in database 136 may be used by a payment/credit provider, such as service provider server 140, to associate merchant device 130 with a particular account maintained by the payment/credit provider. Item, sales, and/or benefit information for items sold by the merchant associated with merchant device 130 may be stored to database 136.

Merchant device 130 includes at least one communication module 138 adapted to communicate with communication device 110 and/or service provider server 140. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 140 may be maintained, for example, by an online service provider, which may provide transaction processing and payment services, as well as budget establishment and monitoring services. In this regard, service provider server 140 includes one or more processing applications which may be configured to interact with communication device 110, merchant device 130, and/or another device/server to facilitate an augmented reality of recommendation of items between users based on data captured by one of the user, as well as processing transactions for the items. In one example, service provider server 140 may be provided by PAYPAL®, Inc. of San Jose, Calif., USA. However, in other embodiments, service provider server 140 may be maintained by or include another type of service provider, which may provide connection services to a plurality of users.

Service provider server 140 of FIG. 1 includes a budgeting application 142, other applications 144, a database 146, and a network interface component 148. Budgeting application 142 and other applications 144 may correspond to executable processes, procedures, and/or applications with associated hardware. In other embodiments, service provider server 140 may include additional or different modules having specialized hardware and/or software as required.

Budgeting application 142 may correspond to one or more processes to execute software modules and associated specialized hardware of service provider server 140 to provide budgeting services, recommendations, and tracking to users, for example, by generating a budget based on user input and/or available user financial data, and tracking the budget through user purchases and purchase intents during one or more shopping sessions with merchant device 130. In this regard, budgeting application 142 may correspond to specialized hardware and/or software to first receive a request to establish a budget from a device of a user, such as through communication device 110. In response to the request, budgeting application 142 may provide one or more interfaces that may include interface fields, forms, or menus, to allow for data input that establishes a budget for a user. The budget may include an amount to be spent over a time period, a maximum amount per transaction, a limit to particular items, brands, item costs, or item cost/type in comparison to other same or similar items (e.g., general brands versus name brand items). The budget may be set for the user personally, or may be set for another user, such as a parent setting a budget for a child. Once established, the budget may then include one or more constraints or restrictions on purchase at a location or during an online shopping session. Budgeting application 142 may then locally store the budget data, and may cause communication device 110 to store the budget data for use in generating an augmented reality or a virtual reality counterpart of captured visual data. The budget may also affect online marketplace data displayed through one or more interfaces.

Budgeting application 142 may provide the budget data for use within a virtual reality or augmented reality displayable on communication device 110. For example, the budget may affect representations of items in visual data on communication device 110 using the processes described herein. Budgeting application 142 may provide the virtual reality/augmented reality through communication device 110, or communication device 110 may generate the virtual/augmented reality using the stored budget data. Budgeting application 142 may also utilize user responses to the augmented reality to reconfigure the budget. For example, if the user changes a visual indicator for an item, or requests information for a highlighted or obscured item, budgeting application 142 may add or remove the item from a budget or may change a budget based on the item. Budgeting application 142 may receive item shopping or browsing data, which may correspond to online browsing or shopping data, or may correspond to transactional, video, or audiovisual data including one or more items purchased or to be purchased by the user. As discussed herein, the item shopping or browsing data may include one or more tags of items. Thus, the tag may identify an object within the environment for purchase by a user. Budgeting application 142 may determine how the purchase or intended purchase affects a budget, and may then re-process available items in captured data to determine whether any items now are compatible or incompatible with the user's budget based on the purchases or intended purchases.

In various embodiments, service provider server 140 includes other applications 144 as may be desired in particular embodiments to provide features to service provider server 140. For example, other applications 144 may include security applications for implementing server-side security features, programmatic client applications for interfacing with appropriate application programming interfaces (APIs) over network 150, or other types of applications. Other applications 144 may contain software programs, executable by a processor, including a graphical user interface (GUI), configured to provide an interface to the user when accessing service provider server 140, where the user or other users may interact with the GUI to more easily view and communicate information. In various embodiments, other applications 144 may include connection and/or communication applications, which may be utilized to communicate information to over network 150.

Additionally, service provider server 140 includes database 146. The user and/or the merchant may establish one or more digital wallets and/or accounts with service provider server 140. Digital wallets and/or accounts in database 146 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to service provider server 140, e.g., from communication device 110, one or more digital wallets and/or payment accounts belonging to the users may be found. Database 146 may store received budget data used to establish a budget, as well as item shopping or browsing data. Database 146 may also store the user preferences for a budget, and/or item purchase or acquisition information.

In various embodiments, service provider server 140 includes at least one network interface component 148 adapted to communicate communication device 110 and/or merchant device 130 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2B:
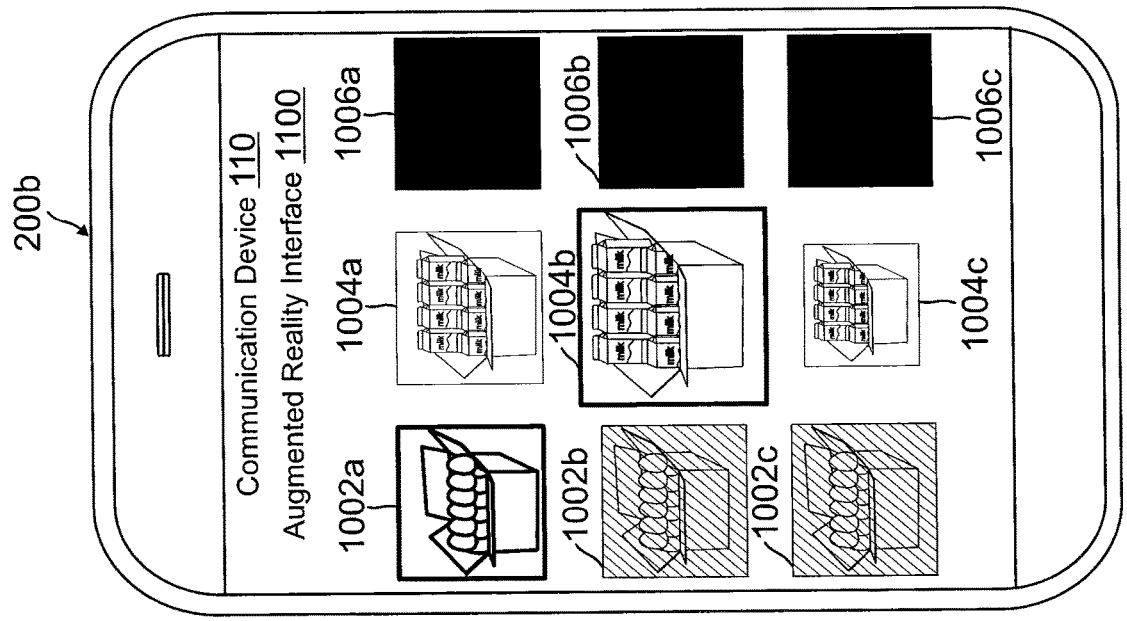
FIG. 2B is an exemplary interface of a communication device displaying an augmented reality having output data limited to restrictions on item acquisition, according to an embodiment.
Figure 2A:
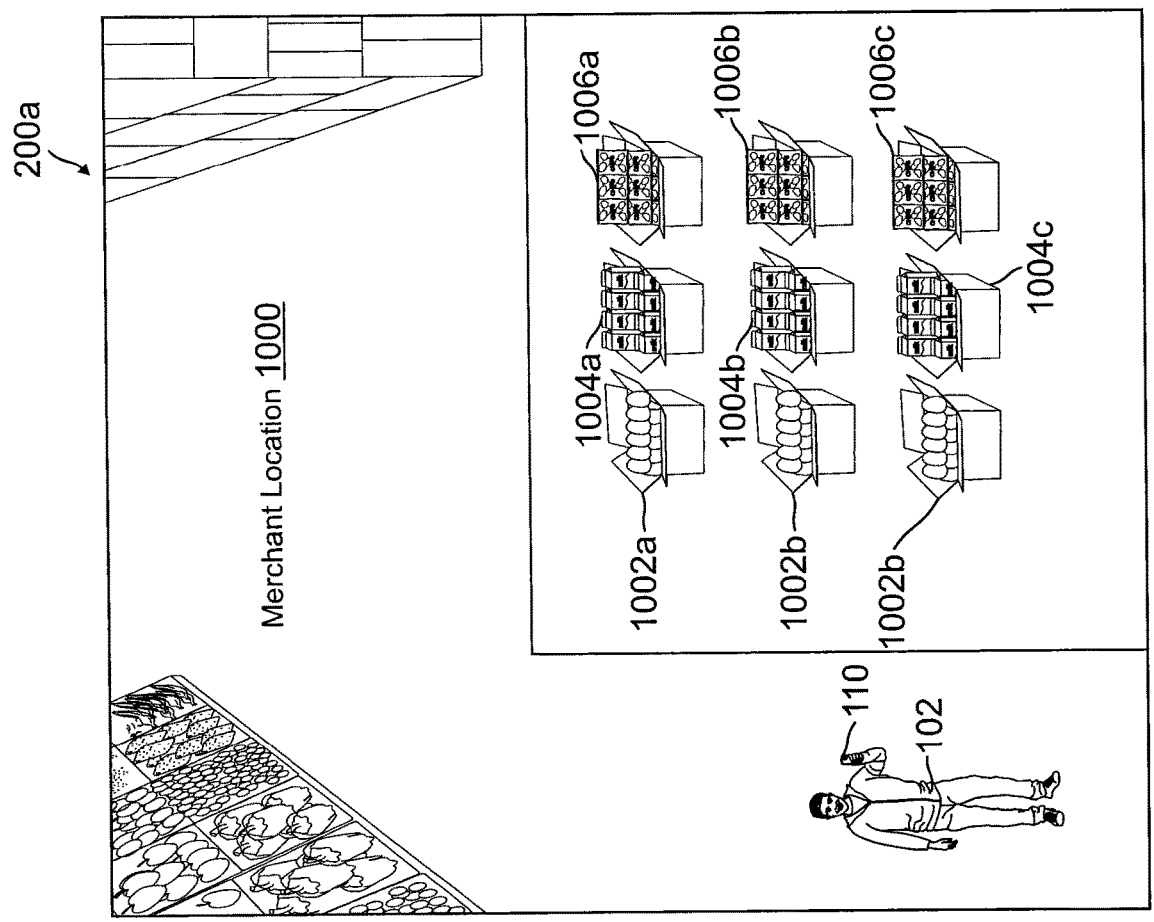
FIG. 2A is an exemplary environment having a first user utilizing a communication device to capture an environment for display of an augmented reality having output data limited to restrictions on item acquisition, according to an embodiment.

FIG. 2A is an exemplary environment having a first user utilizing a communication device to capture an environment for display of an augmented reality having output data limited to restrictions on item acquisition, according to an embodiment. FIG. 2A includes an environment 200*a* of a real-world location having a user 102 viewing one or more items for sale at a merchant location 1000. In this regard, user 102 may utilize communication device 110 corresponding generally to the described features, processes, and components of communication device 110 in system 100 of FIG. 1.

For example, user 102 may utilize communication device 110 to capture audio, video, and/or audiovisual data of a merchant location 1000 in environment 200a. User 102 may view one or more items that user 102 would like to receive budgetary recommendations for through an augmented reality. Communication device 110 may include one or more input devices to capture visual data of user 102 shopping or browsing for items for purchase from merchant location 1000, including three sets of similar items having different item information, such as price, brand, and/or type. Thus, the captured data by communication device 110 may include objects in merchant location 1000, such as eggs 1002a, eggs 1002b, and eggs 1002c. Each of eggs 1002a-c may correspond to a different brand, type, and/or price of a more generic genus of items, such as eggs in general, and therefore may correspond to sub-items or species of the more general item of eggs. Similarly, merchant location 1000 may also have milk 1004a, milk 1004b, and milk 1004c, as well as chips 1006a, chips 1006b, and chips 1006c, where milk 1004a-c and chips 1006a-c may similarly correspond to a general category of milk and chips, respectively, where each of milk 1004a-c and chips 1006a-c correspond to a different brand, type, and/or price of the more generic category.

As user 102 views merchant location 1000, user 102 may view eggs 1002a-c, milk 1004a-c, and/or chips 1006a-c and capture visual data of eggs 1002a-c, milk 1004a-c, and/or chips 1006a-c. User 102 may then request communication device 110 provide an augmented reality showing merchant location 1000 with eggs 1002a-c, milk 1004a-c, and/or chips 1006a-c based on a budget of user 102. In order to determine the augmented reality, communication device 110 may capture the visual data of eggs 1002a-c, milk 1004a-c, and/or chips 1006a-c, as well as other data. Various data within merchant location 1000 may be used to identify eggs 1002a-c, milk 1004a-c, and/or chips 1006a-c including a geolocation of merchant location 1000, an visual data of eggs 1002a-c, milk 1004a-c, and/or chips 1006a-c, an arrangement of eggs 1002a-c, milk 1004a-c, and/or chips 1006a-c, and/or tags or beacons including item data that may be associated with eggs 1002a-c, milk 1004a-c, and/or chips 1006a-c. Additionally, voice data may be utilized to identify items, such as by stating items or otherwise providing data of items (e.g., reading an item identifier).

Once the visual data is captured, item identification may be performed to determine item data, which may be compared with a budget of user 102 to determine which of eggs 1002a-c, milk 1004a-c, and/or chips 1006a-c should be purchased based on the budget. In various embodiments, communication device 110 may process the captured visual data to identify eggs 1002a-c, milk 1004a-c, and/or chips 1006a-c and retrieve item data for eggs 1002a-c, milk 1004a-c, and/or chips 1006a-c and their corresponding prices. Communication device 110 may then generate an augmented reality for a budget that recommends purchases or avoiding purchases of one or more of eggs 1002a-c, milk 1004a-c, and/or chips 1006a-c based on the budget. However, in other embodiments, the captured data may be communicated to a service provider, which may determine item identification, item data, and a corresponding augmented reality displaying eggs 1002a-c, milk 1004a-c, and/or chips 1006a-c based on recommendations for purchase using a budget for user 102. Once the augmented reality is determined, the augmented reality may be displayed to the user as shown in FIG. 2B.

FIG. 2B is an exemplary interface of a communication device displaying an augmented reality having output data limited to restrictions on item acquisition, according to an embodiment. FIG. 2B includes an augmented reality interface 1100 of communication device 110, for example, corresponding generally to an interface output through the described features, processes, and components of augmented reality application 120 of communication device 110 in system 100 of FIG. 1. In this regard, a user, such as user 102 in environment 200a, utilizing communication device 110 may view augmented reality interface 1100 on communication device 110, where augmented reality interface 1100 corresponds to an interface displaying an augmented reality determined and generated by augmented reality application 120 of communication device 110 in system 100 of FIG. 1.

In this regard, augmented reality interface 1100 displays captured audiovisual data of an environment, such as merchant location 1000 in FIG. 2A. However, the displayed audiovisual data output through a display device of communication device 110 may be displayed as an augmented reality having one or more graphics overlaid onto environment data so that the graphics show up in the environment and alter the output or view/content of the environment, or alterations of audiovisual output parameters for visual data pixels or other content data. Audio may also be altered, for example, by playing pleasant music when an item is selected by the user or viewed by the user, or playing a sound effect to either congratulate the user for selecting an item within a budget or warning a user of an item outside of a budget. For example, augmented reality interface 1100 includes an augmented reality of merchant location 1000 that displays eggs 1002a-c, milk 1004a-c, and chips 1006a-c to the user. Augmented reality interface 1100 first displays eggs 1002a-c in the augmented reality, where a visual output of eggs 1002a-c may be changed based on a budget of the user associated with communication device 110. For example, eggs 1002a may meet the budget by coming in at or under a budgetary cost, type, and/or brand restriction on purchase of eggs in general. Thus, a visual indicator shown as a box highlighting eggs 1002a may be generated and overlaid onto the visual output of augmented reality interface 1100. However, eggs 1002b and 1002c may exceed the budgetary restriction, and are therefore shown as hidden, obscured, and/or blurred in augmented reality interface 1100 so that eggs 1002b and 1002c are not shown to the user in augmented reality interface 1100.

Milk 1004a-c is also shown with visual indicators or modifications of visual output representations of milk 1004a-c based on the budget of the user. Milk 1004a is shown as a normal traditional size, which may indicate that milk 1004a meets the user's budget, but may not be the most preferred item for the budget. For example, milk 1004a may cost $3, which may be the maximum for the user's budget. Conversely, milk 1004b is shown as an enlarged representation of milk 1004b, which is larger than a normal, base, or original representation, and is larger than milk 1004a and milk 1004c in augmented reality interface 1100. In this regard, milk 1004b may be the most preferred item for a budget if milk 1004b meets or costs less the budgetary restrictions (e.g., is less than the budgetary maximum). Milk 1004b may therefore be less than milk 1004a, for example, costing only $2. In contrast, milk 1004c may be shown as smaller and more hidden to make milk 1004c draw less attention. Milk 1004c may exceed a budgetary restriction, and therefore should not be purchase. For example, milk 1004c may cost $5 and exceed the budgetary maximum of $3.

Chips 1006a-c are also shown as entirely hidden, obscured, or blurred in augmented reality interface 1100. In this regard, none of chips 1006a-c may be within a budget that includes necessary purchases for the user. For example, chips 1006a-c may be considered an unnecessary item as not on a budget or within a shopping list, and therefore purchase of one or more of chips 1006a-c may negatively affect the user's budget by purchasing unnecessary items. However, chips 1006a-c may be revealed in augmented reality interface 1100 based on indications of purchase of eggs 1002a-c and/or milk 1004a-c. For example, if eggs 1002a and milk 1004b that are both recommended based on the user's budget are added to a shopping cart or transaction, one or more of chips 1006a-c may be revealed based on savings of the user for purchases that meet or are less than a budgetary restriction for the user. Each of the visual preferences for outputting a visual recommendation and indicator for eggs 1002a-c, milk 1004a-c, and/or chips 1006a-c may be set with communication device 110 and/or a service provider when generating a budget, or may be determined based on user behavior of the user viewing augmented reality interface 1100.

Figure 3:
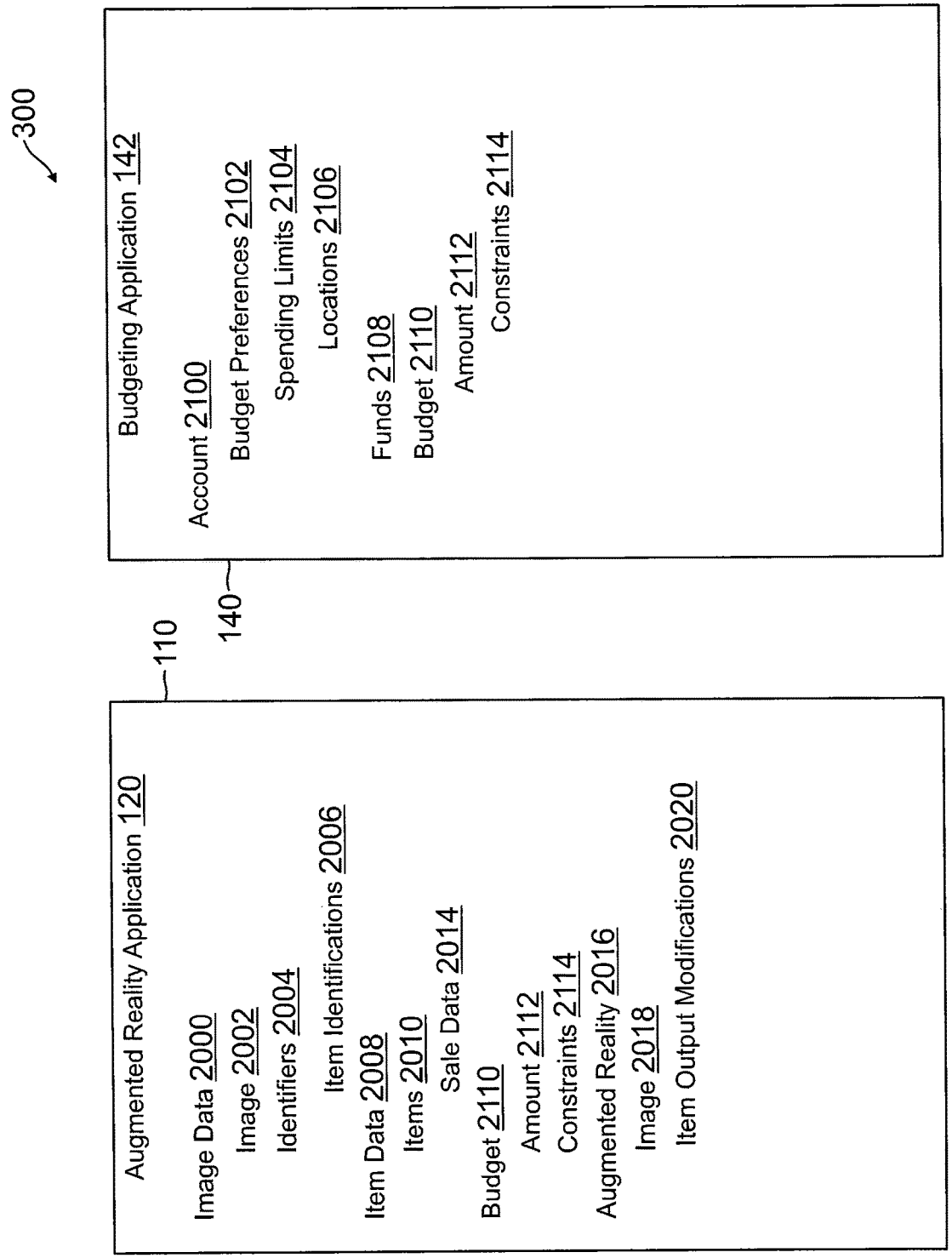
FIG. 3 is an exemplary system environment showing a communication device and a service provider server interacting to provide data necessary to output an augmented reality having visual elements according to item acquisition limitations, according to an embodiment.

FIG. 3 is an exemplary system environment showing a communication device and a service provider server interacting to provide data necessary to output an augmented reality having visual elements according to item acquisition limitations, according to an embodiment. Environment 300 of FIG. 3 includes communication device 110 and service provider server 140 discussed in reference to system 100 of FIG. 1.

Communication device 110 includes augmented reality application 120 corresponding generally to the processes and features discussed in reference to augmented reality application 120 in system 100 of FIG. 1. In this regard, augmented reality application 120 includes captured audio, video, and/or audiovisual data, as well as information processed from such data, such as item identification and purchase data, a budget and item visual indicators or modifications based on the budget, and an output augmented reality having recommendations for item purchases though image processing. For example, augmented reality application 120 include image data 2000 captured by communication device 110, where image data 2000 includes an image 2002 having one or more objects that may correspond to items required to be identified through object recognition and other object recognition data that may assist in item identification. Thus, image 2002 may be processed to determine identifiers 2004, which may include item identifications 2006 of the items in image 2002. Using item identifications, augmented reality application 120 may perform item look-ups to retrieve item data 2008 for items 2010 in item identifications 2006. Items 2010 may be associated with sale data 2014, which may be processed using a budget set using budgeting application 142 with service provider server 140.

Thus, service provider server 140 includes budgeting application 142 corresponding generally to the processes and features discussed in reference to budgeting application 142 in system 100 of FIG. 1. In this regard, budgeting application 142 includes data for a budget set by a user with an account 2100 of the user. The budget may be set using budget preferences 2012, which may include data such as spending limits 2014 for restrictions or constraints for purchases, including restrictions at locations 2106. Account 2100 may also include funds 2108, which may be used to determine a budget 2110 for account 2100 in certain embodiments. Using at least budget preferences 2102, budget 2110 may be determined and set by budgeting application 142, which may include an amount 2112 that a user may be limited to spending at a time, location, or on particular items, as well as other constraints 2114, such as types of item purchases, brands, etc.

Budget 2110 may be provided to augmented reality application 120 for processing with image data 2000. For example, amount 2112 and constraints 2114 may be processed with sale data 2014 to determine which of items 2010 should be purchased by the user associated with communication device 110, and which items should be avoided based on budget 2110. Augmented reality application 120 may then determine visual output data to alter an appearance of image 2002, such as a visual representation of items 2010 in image 2002, based on those of items 2010 that should be recommended for purchase based on budget 2110, and those which should not be recommended. After generation of the image modifications or overlay indicators, augmented reality application 120 may determine an augmented reality 2016, which may cause generation of image 2018 different from image 2002 based on the generated image modifications or overlays, which may include item output modifications 2020 for those visual changes of image 2002.

Figure 4:
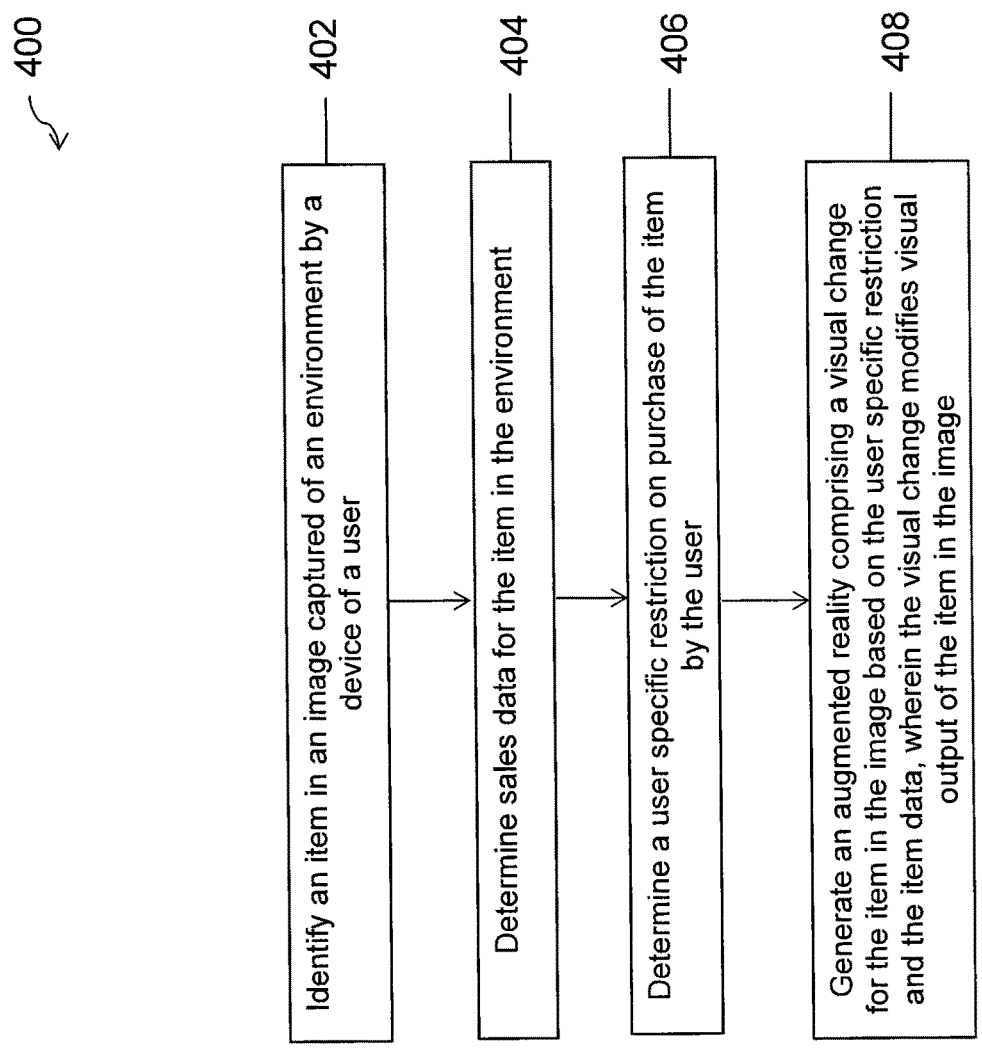
FIG. 4 is a flowchart of an exemplary process for an augmented reality output based on item acquisition limitations, according to an embodiment.

FIG. 4 is a flowchart of an exemplary process for an augmented reality output based on item acquisition limitations, according to an embodiment. Note that one or more steps, processes, and methods described herein may be omitted, performed in a different sequence, or combined as desired or appropriate.

At step 402 of flowchart 400, an item in an image is identified using a visual identifier for the item. Prior to this, the image may be received of the item in an environment from a device of a user. The item may be identified through a visual identification that is determined using at least one of object comparison of the item to object image data, metadata for the image, a location for the image or environment, or identification of a person in the image. Additionally, the item may be identified by first receiving item identification data from at least one other device, wherein the item identification data comprises pre-processed visual data of the environment that includes a an image identifier of the item in the environment, and wherein the item is identified using the image identifier in the item identification data. In certain embodiments, the item may be identified, and/or item/sales data may be received from one of an RFID tag or a BLE beacon associated with the item.

Sale data for the item in the environment, such as price and availability, may be determined, at step 404 of flowchart 400. A user specific restriction on purchase of the item by the user may be determined, at step 406 of flowchart 400. The user specific restriction may be linked to an account of the user with a service provider. Thus, the user specific restriction may be determined by receiving an account identifier for the account, accessing account information for the account using the account identifier, and determining the user specific restriction using the account information. Prior to determining the restriction, budgetary restrictions set for the user may be received, wherein the budgetary restrictions comprise an expenditure amount available for purchases in the environment by the user, wherein the user specific restriction is determined using the budgetary restrictions.

At step 408 of flowchart 400, a visual change for the item in the image may be generated based on the user specific restriction and the item data, wherein the visual change modifies visual output of the item in the image. This may be done using the identification of the item and the item or sales data by comparing the item/sales data to the user specific restriction on purchase of the item. The visual change may cause the item to be more or less visible in the image than an original visibility of the item in the image without the visual change. For example, the visual change may comprise a graphic object overlaid onto the item in the image, where the graphic object performs one or more of highlighting the item data, adjusting a color gradient of the item, blurring or unblurring the item, or adjusting a brightness of the item. This may include revealing or hiding the item in the image.

Moreover, an augmented reality view of the environment may be output based on the visual change and the image. The restriction may correspond to a budget of the user, and wherein the augmented reality view comprises output data having a recommendation for purchase of the item based on the budget. A response to the augmented reality view may be received from the device, wherein the response requests a change to the visual change from the user, and the visual change may be updated based on the response. Transaction history information for a purchase performed by the user in the environment may also be received, which may update the augmented reality view and/or visual change based on the budget and the purchase. For example, if an item is concealed or hidden, in response to receiving a transaction history for a purchase amount, it may be determined whether to reveal the item based on a purchase amount and the restriction, and if visual change may be modified. Thus, the transaction history information may comprise a transaction for an amount that meets a budgetary limitation in the budget, and the item may be revealed in the augmented reality view. However, if the transaction is for an amount that exceeds the budgetary limitation in the budget, the item may become hidden or remain hidden in the augmented reality view.

Figure 5:
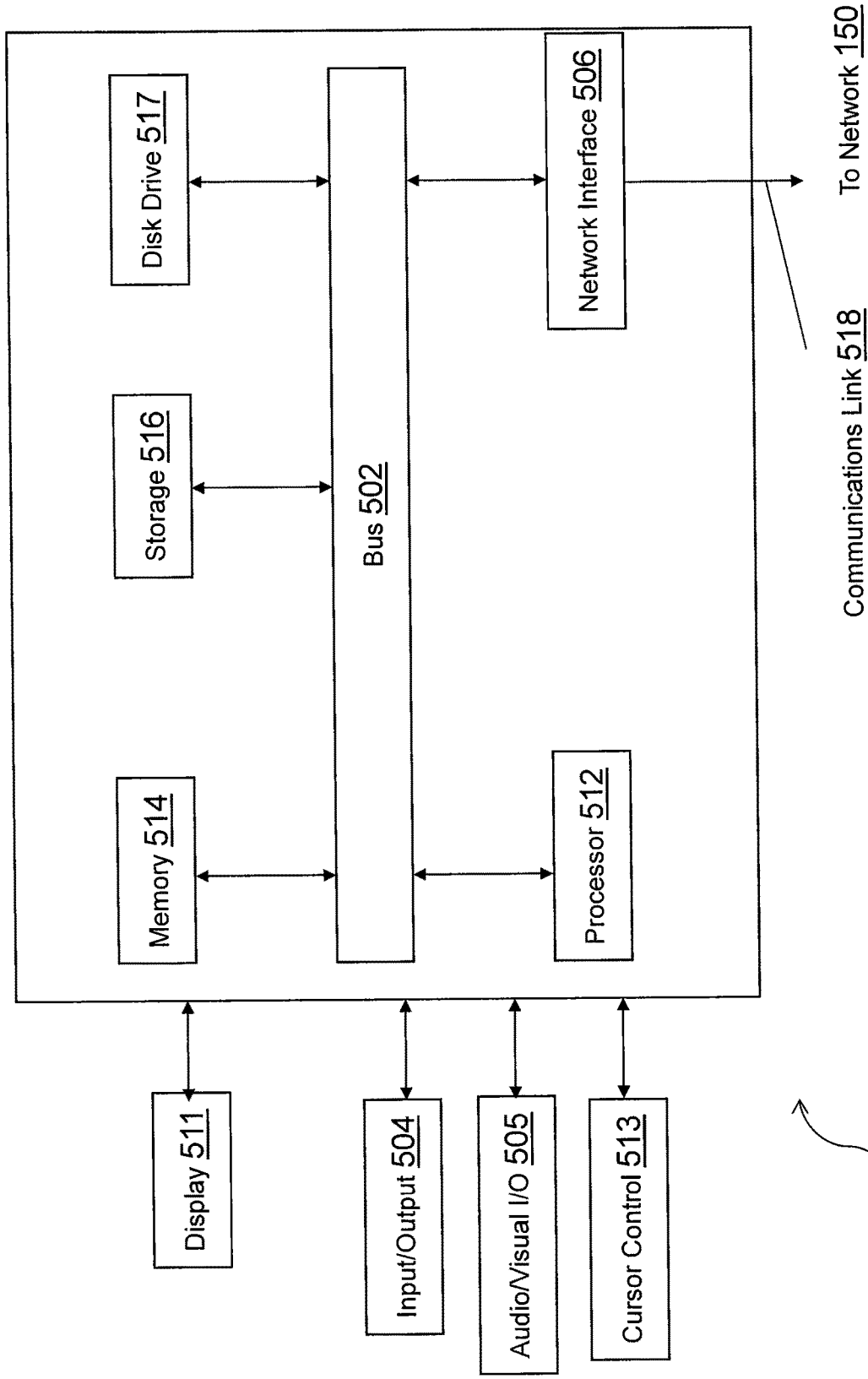
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a camera;
    a non-transitory memory; and
    one or more hardware processors coupled to the non-transitory memory and configured to read instructions from the non-transitory memory to cause the system to perform operations comprising:
        receiving visual data captured by the camera of a scene comprising an object located in the scene;
        determining a visual identification of the object from the visual data using object recognition data;
        determining an object-specific visual indicator for the object based on the visual identification and a constraint on acquisition of the object by a user associated with system;
        determining augmented reality output data for the object based on the visual data and the object-specific visual indicator, wherein the augmented reality output data alters an appearance of the object in the visual data;
        outputting the augmented reality output data with the visual data;
        receiving information indicating a purchase of a different object associated with the object during a display of the object-specific visual indicator with the object in the augmented reality output data; and
    removing the object-specific visual indicator for the object in the augmented reality output data based on the information.

2. The system of claim 1, wherein the visual identification is by an image processing operation using object recognition of at least a portion of the visual data with object recognition data, and wherein the object recognition data is received by the system from an image pre-processor service.

3. The system of claim 1, wherein the determining the object-specific visual indicator comprises:
    determining an item identifier for the object using the visual identification;
    determining item data for the object using the item identifier; and
    comparing the item data to the constraint on acquisition of the object.

4. The system of claim 1, wherein the determining the object-specific visual indicator comprises:
    receiving an item data for the object from one of an RFID tag or a wireless communication device associated with the object; and
    comparing the item data to the constraint on acquisition of the object.

5. The system of claim 1, wherein the object-specific visual indicator causes the object to be more visible or less visible in the visual data than an original visibility of the object in the visual data without the object-specific visual indicator.

6. The system of claim 5, wherein the augmented reality output data comprises the object-specific visual indicator as a graphic object overlaid onto the object in the visual data, and wherein the object-specific visual indicator comprises one of highlighting the object in the visual data, adjusting a color gradient of the object in the visual data, blurring or unblurring the object in the visual data, or adjusting a brightness of the object in the visual data.

7. The system of claim 1, wherein the constraint on acquisition of the object comprises a budget for the purchase of one or more items.

8. The system of claim 7, wherein prior to the receiving the information indicating the purchase, the operations further comprise:
    receiving an identification of a purchase intent by the user;
    determining an amount associated with the purchase intent using the identification and the budget; and
    updating the object-specific visual indicator based on the amount.

9. The system of claim 8, wherein the updating the object-specific visual indicator comprises revealing the object or hiding the object in the visual data based on the amount and the budget.

10. The system of claim 1, wherein the object-specific visual indicator conceals the object in the scene, and wherein the operations further comprise:
    determining whether to reveal the object in the scene based on a transaction history for a purchase amount and the constraint on acquisition of the object; and
    modifying the object-specific visual indicator based on the determining whether to reveal the object in the scene.

11. The system of claim 1, wherein the constraint on acquisition of the object by the user is based on a budget of the user, and wherein the augmented reality output data comprises a recommendation for purchase of the object based on the budget.

12. A method comprising:
    receiving an image of an item in an environment from a device of a user;
    identifying the item in the image;
    determining sale data for the item in the environment;
    determining a user specific restriction on a first purchase of the item by the user;
    generating a visual change of the image of the item based on the user specific restriction and the sale data, wherein the visual change modifies a visual representation of the item in the image;
    outputting an augmented reality view of the environment based on the visual change and the image;
    receiving information indicating a second purchase of a different item associated with the item when the augmented reality view displays the visual change of the item; and
    removing the visual change of the item from the image in the augmented reality view based on the information.

13. The method of claim 12, wherein the user specific restriction is linked to an account of the user with a service provider, and wherein the determining the user specific restriction comprises:
    receiving an account identifier for the account;
    accessing account information for the account using the account identifier; and
    determining the user specific restriction using the account information.

14. The method of claim 13, wherein prior to identifying the item, the method further comprises:

receiving item identification data from at least one other device, wherein the item identification data comprises pre-processed visual data of the environment that includes an image identifier of the item in the environment, and wherein the item is identified using the image identifier in the item identification data.

15. The method of claim 13, wherein prior to receiving the information indicating the second purchase, the method further comprises:

receiving a response to the augmented reality view from the device, wherein the response requests a change to the visual change from the user; and updating the visual change based on the response.

16. The method of claim 12, wherein prior to determining the user specific restriction, the method further comprises:

receiving budgetary restrictions set for the user, wherein the budgetary restrictions comprise an expenditure amount available for purchases in the environment by the user, wherein the user specific restriction is determined using the budgetary restrictions.

17. A service provider system comprising:

a non-transitory memory; and one or more hardware processors coupled to the non-transitory memory and configured to read instructions from the non-transitory memory to cause the service provider system to perform operations comprising:

receiving, from a device, visual data of an environment that comprises an object for sale in the environment;

determining a budget for a user with the service provider system for purchases by the user;

modifying an image of the object based on the budget;

outputting an augmented reality view of the modification of the image to a display of the device;

receiving information indicating a purchase of a different object associated with the object during the outputting of the modification of the image in augmented reality view; and removing the modification of the image in the augmented reality view based on the information.

18. The service provider system of claim 17, wherein prior to removing the modification, the operations further comprise:

updating the modification of the image based on information and the budget.

19. The service provider system of claim 17, wherein the object is for an amount that meets a budgetary limitation in the budget, and wherein the modifying comprises revealing the object in the display of the device with a purchase recommendation.

20. The service provider system of claim 17, wherein the object is for an amount that exceeds a budgetary limitation in the budget, and wherein the modifying comprises hiding the object in the display of the device.

* * * * *